United States Patent [19]

Valentine

[11] Patent Number: 4,570,951
[45] Date of Patent: Feb. 18, 1986

[54] QUICK CHANGE ADAPTER

[76] Inventor: Al L. Valentine, 21658 Summerdale, Southfield, Mich. 48034

[21] Appl. No.: 655,984

[22] Filed: Sep. 27, 1984

Related U.S. Application Data

[63] Continuation of Ser. No. 399,618, Jul. 19, 1982, abandoned.

[51] Int. Cl.⁴ .............................................. B23Q 3/00
[52] U.S. Cl. ..................................... 279/1 R; 279/77
[58] Field of Search ................... 279/1 B, 96, 9 R, 76, 279/77, 1 R; 248/222.1, 221.3, 220.2, 310, 73; 29/568; 403/330, 331; 901/41; 414/736, 737

[56] References Cited

U.S. PATENT DOCUMENTS

| | | | |
|---|---|---|---|
| 357,429 | 2/1887 | Walker | 279/77 |
| 587,464 | 8/1897 | Swick | 279/77 |
| 986,761 | 3/1911 | Roscoe | 279/77 |
| 2,639,158 | 5/1953 | Procos | 279/77 |
| 2,682,414 | 6/1954 | Richardson | 279/77 |
| 3,011,235 | 12/1961 | Pacheco | 403/331 X |
| 4,397,094 | 8/1983 | Nakamura | 29/568 X |

Primary Examiner—William R. Briggs
Attorney, Agent, or Firm—Krass and Young

[57] ABSTRACT

A quick release adapter for releasably mounting a tool or the like on a support includes a holding fixture adapted to be mounted on the support and having a slot therein for slideably receiving a mounting plate upon which there is secured a tool or the like. The mounting plate is releasably locked in the holding fixture by a locking element which extends through a through-hole in the fixture. The locking element is carried by a lever which is pivotally mounted on the back of the fixture and includes a handle which may be manipulated to move the locking element into and out of locking engagement with one edge of the mounting plate.

11 Claims, 5 Drawing Figures

QUICK CHANGE ADAPTER

This application is a continuation of application Ser. No. 399,618, filed 7-19-82, abandoned.

TECHNICAL FIELD

The present invention generally relates to coupling devices and deals more particularly with a quick release adapter for releasably mounting a tool or the like on a support.

BACKGROUND ART

Various types of apparatus such as robotic manipulators are adapted to operate various kinds of tools which are releasably mounted on a supporting portion of the apparatus by screws or the like. In order to change a tool, an operator must normally release several screws in order to adapt the apparatus for use with a different tool.

Quick release couplings for use in adapting apparatus for use with several tools are known in the art. However, known releasable couplings have a number of drawbacks which prevent their use in certain applications such as robotic manipulators. For example, robotic arms are normally supported in a cantilever manner and there is therefore a definite limit to the weight which may be supported at the outer end of the arm. It is therefore desirable to minimize the weight of the arm itself as well as the coupling mechanisms between the arm and the tool so that heavier tools may be mounted on the arm.

Several types of known releasable couplings are unsuited for use in manufacturing and production applications with robotic arms because of their inability to positively and reliably hold a tool in a fixed position relative to the robot's arm. Even a slight degree of rotational movement of the tool relative to the arm may prevent the tool from properly registering with a part which is to be contacted or manipulated. Consequently, it is necessary to use an exceptionally heavy and cumbersome adapter to provide the necessary rigidity, but this alternative is unacceptable where the combined weight of the adapter and tool exceed the weightlifting capacity of the robot's arm.

Another difficiency of known coupling adapters resides in the difficulty of operating the locking mechanisms which these adapters employ for locking the releasable components of the adapter. Moreover, these locking mechanisms are sometimes difficult to access and require the use of two hands in order to operate.

The present invention is directed toward overcoming each of the difficiencies of the prior art discussed above.

DISCLOSURE OF THE INVENTION

In accordance with the present invention, a quick release adapter is provided for releasably mounting a tool or the like on a support such as a robotic arm. The adapter includes a holding fixture adapted to be mounted on the support and provided with a slot therein for slideably receiving a mounting plate upon which there is mounted a tool or the like. The mounting fixture is provided with a through-hole therein within which there is shiftably disposed a locking element carried by a lever pivotally mounted on the holding fixture. Pivoting of the lever shifts the locking element into and out of engagement with one edge of the mounting plate so as to provide simple, quick release of the mounting plate, thus to permit changing tools.

BRIEF DESCRIPTION OF THE DRAWINGS

In the drawings, which form an integral part of the specification and are to be read in conjunction therewith, and in which like reference numerals are employed to designate identical components in the various views.

BEST MODE FOR CARRYING OUT THE INVENTION

Figure 1:
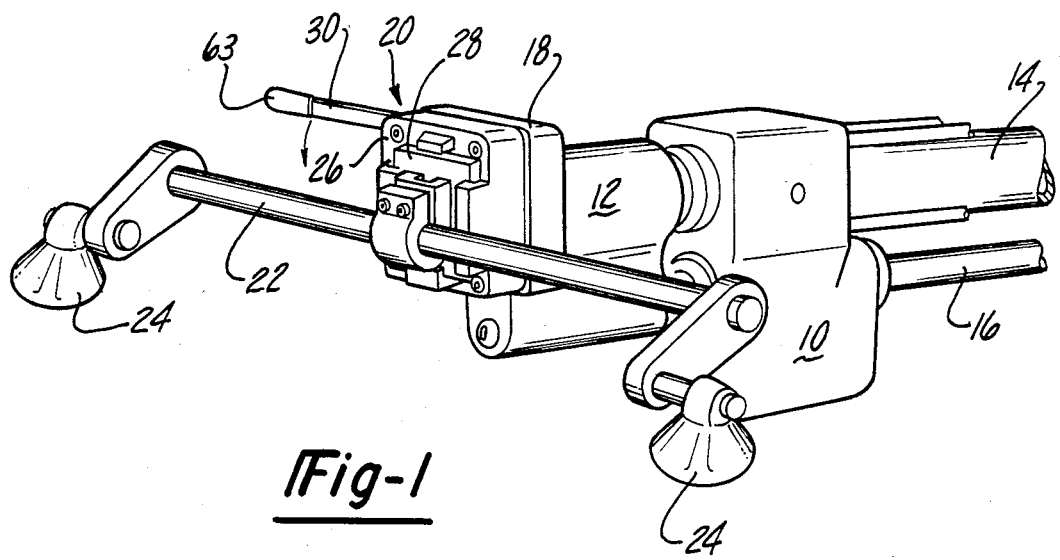
FIG. 1 is a perspective view of the quick change adapter of the present invention shown in operative relationship to a robotic manipulator and a tool intended to be mounted on the manipulator.
Figure 2:
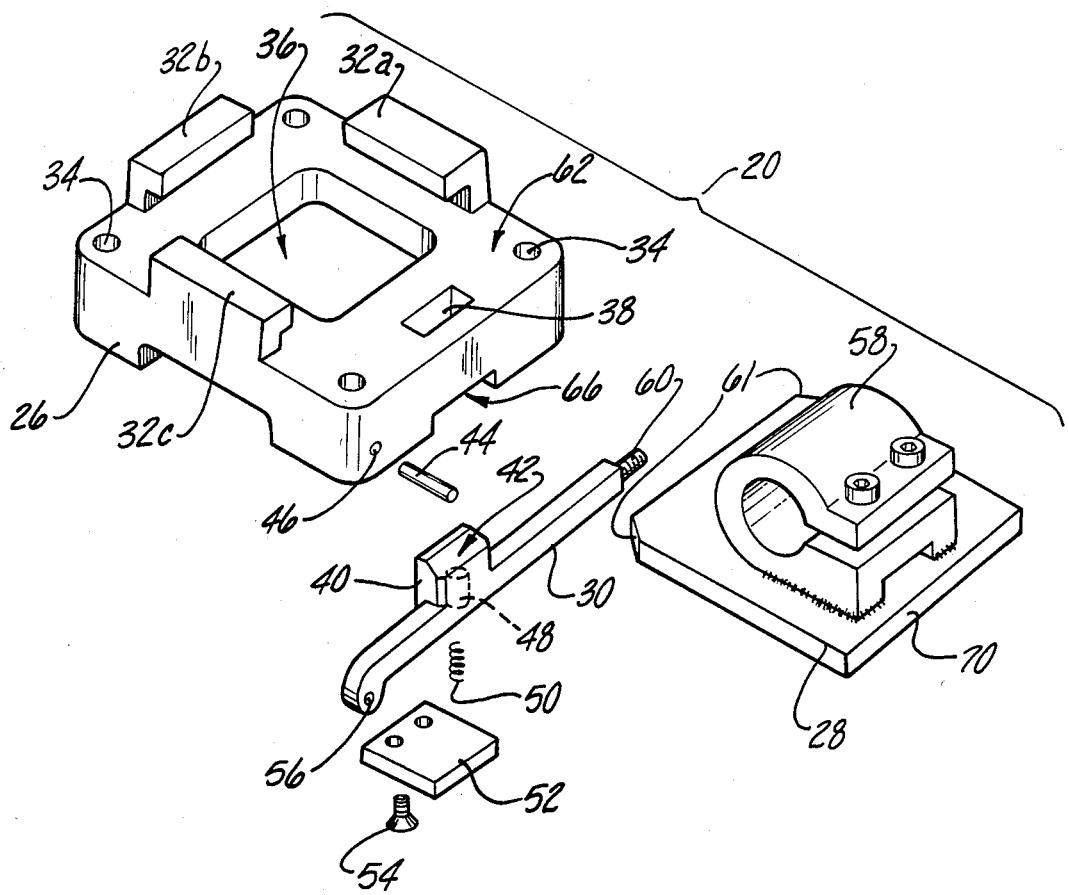
FIG. 2 is a perspective, exploded view of the adapter shown in FIG. 1.
Figure 3:
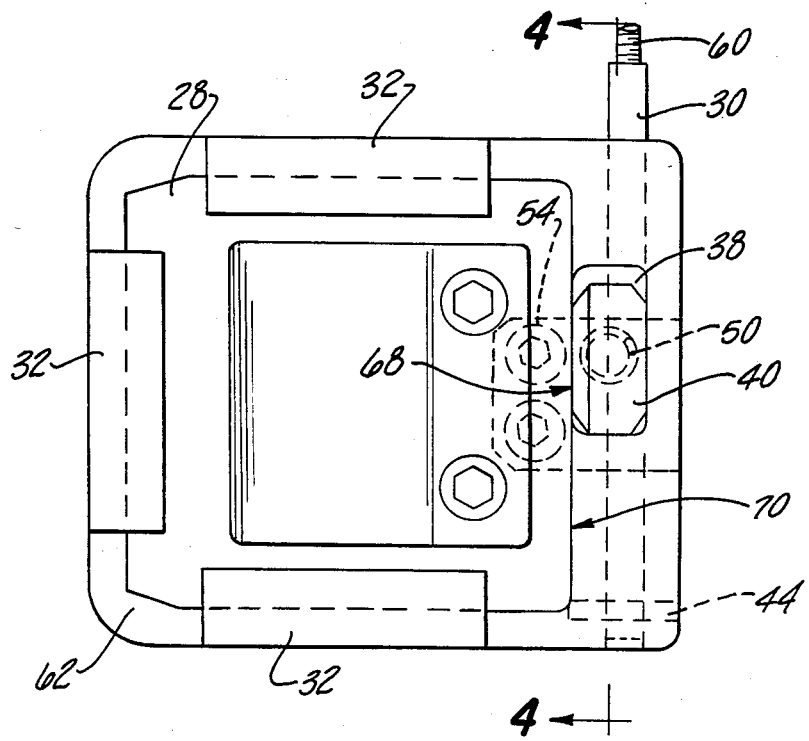
FIG. 3 is a front elevational view of the adapter shown in FIG. 1.
Figure 4:
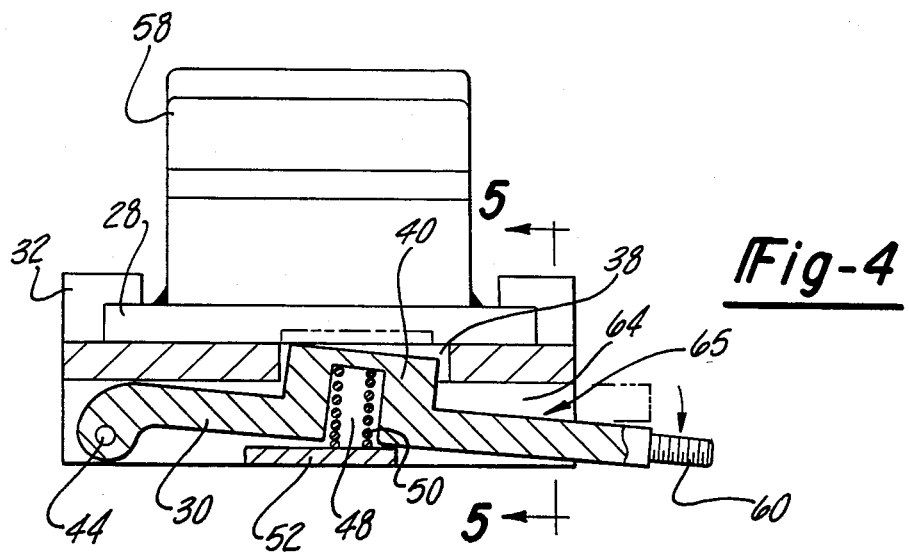
FIG. 4 is a sectional view taken along the line 4—4 in FIG. 3.
Figure 5:
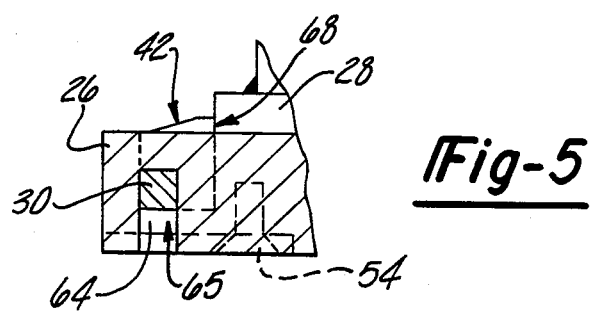
FIG. 5 is a sectional view taken along the line 5—5 in FIG. 4.

Referring to the drawings, the present invention is broadly concerned with a quick release adapter, generally indicated by the numeral 20, for releasably mounting a tool or the like on a support. As depicted in FIG. 1, for illustrative purposes, a tool comprising a transversely extending support rod 22 and a pair of suction cups 24 is mounted on a robotic manipulator of the type disclosed in U.S. Patent Application Ser. No. 374,831, filed May 5, 1982, U.S. Pat. No. 4,507,045, the entire disclosure of which is hereby incorporated by reference herein. The manipulator broadly includes a support member 10 upon which there is mounted a piston and cylinder 14 having an output shaft which, in combination with a guide rod 16, mounts a mounting head 12 for reciprocable movement relative to support member 10. Mounting head 12 includes a cover plate 18 having a number of suitable apertures (not shown) which allow various types of tools to be attached to the manipulator.

The adapter 20 includes a holding fixture 26 which is generally rectangular in shape and includes a plurality of apertures 34 at the corners thereof for receiving machine screws which mount the fixture 26 in face-to-face relationship on the cover plate 18. Holding fixture 26 includes an upper substantially flat face 62 having a cutout 36 therein for weight reduction. Three L-shaped legs or retaining guides 32a, 32b and 32c, formed integral with the fixture 26 are disposed along three corresponding edges of the face 62 so as to define a slot within which a substantially flat rectangular mounting plate 28 may be slideably received.

Mounting plate 28 includes a pair of beveled corners 61 which aid in guiding the mounting plate 28 into the slot defined by guides 32. A conventional clamp 58 secured to the outer face of mounting plate 28 as by welding secures rod 22 on plate 28.

A locking assembly for securely locking the mounting plate 28 in a locked position on holding fixture 26 includes an elongate lever 30 disposed within a groove 64 in back of face 62 and along the upper edge of holding fixture 26. Lever 30 has one end thereof pivotally mounted by a pivot pin 44 which extends through an aperture 46 in one corner fixture 26. The opposite end of lever 30 extends through an opening 65 in fixture 26, outwardly beyond one edge of the fixture and may be provided with threads 60 upon which there is threadably received a handle member 63 for operating lever 30. A locking element 40 on locking lever 30, intermediate the ends thereof, extends upwardly through a through-hole 38 in holding fixture 26, along the upper edge of the latter. Locking element 40 is provided with an essentially flat locking face 68 which is adapted to conformingly engage a locking edge 70 defined along one side of mounting plate 28 so as to retain the latter in a locked position on holding fixture 26. Locking element 40 also includes a beveled surface 42 opposite the locking face 68 which is adapted to slideably engage the leading edge of mounting plate 28 when the latter is inserted into the slot on holding fixture 26.

Locking element 40 is provided with an aperture 48 in the bottom thereof within which there is received a spring 50. A retaining plate 52 secured with screws 54 in a cutout 66 of holding fixture 26 acts as a seat for the spring 50 which biases the lever 30 to pivot locking element 40 upwardly through through-hole 38.

In operation, the forward edge of mounting plate 28 is brought into contact with beveled face 42 of locking element 40 and the plate 28 slides downwardly into the leading edge of the slot defined by opposing guides 32a and 32c. If the force applied to plate 28 is sufficient to overcome the biasing influence of spring 50, lever 30 is pivoted downwardly thereby drawing locking element 40 into through-hole 38 permitting the free sliding movement of plate 28 until the leading edge of the latter engages guide 32b. At the point that the leading edge of mounting plate 28 contacts guide 32b, the locking edge 70 marginally clears through-hole 38 and the spring 50 causes lever 30 to pivot upwardly thereby bringing the locking face 68 into tight engagement with locking end 70. The distance between guide 32b and locking face 68, as well as the distance between guides 32a and 32c closely match the length and width of mounting plate 28 so as to tightly receive the mounting plate 28. Thus, mounting plate 28 is securely mounted on holding fixture 26 and the guide elements 32a-32c, in combination with locking face 68 prevent rotation of plate 28 relative to fixture 26.

In order to change tools, the operator merely depresses lever 30 which draws locking element 40 out of locking relationship to locking end 70 thus permitting withdraw of mounting plate 28 from holding fixture 26. The operator then may install a different tool which is secured to a mounting plate identical to mounting plate 28 shown in the drawings.

From the foregoing, it is apparent that the quick change adapter described above not only provides for the reliable accomplishment of the objects of the invention but does so in a particularly effective and economical manner. It is recognized of course, that those skilled in the art may make various modifications or additions to the preferred embodiment chosen to illustrate the invention without departing from the scope and spirit of the present contribution to the art.

For example although the fixture 26 has been disclosed above as being secured to the mounting head 12 and the mounting plate 28 as being secured to the tool (rod 22), the invention may be readily employed in the reverse mounting arrangement in which fixture 26 is secured to the tool and the mounting plate 28 is secured to the supporting mounting head 12. Accordingly, it is to be understood that the protection sought and to be afforded hereby should be deemed to extend to the subject matter claimed and all equivalents thereof fairly within the scope of the invention.

I claim:

1. A releasable coupling comprising:
a mounting plate;
a tool holder secured to the front face of said mounting plate and adapted to releasably grasp a tool therein to secure the tool to the front face of said mounting plate;
a holding fixture defining a vertically extending slot at its front face generally conforming in size and configuration to said mounting plate for slidably and snugly receiving said mounting plate therein with the rear face of the mounting plate juxtaposed to and sliding on the front face of the holding fixture;
means on said holding fixture for releasably securing the rear face of said fixture to a support member;
a stop on said holding fixture adjacent the bottom of said slot including surface areas for engaging the bottom edge of said mounting plate as the latter arrives at the bottom of said slot and thereby support substantially all of the weight of said mounting plate and associated tool; and
locking means on said holding fixture for releasably engaging the top edge of said mounting plate with the bottom edge of said mounting plate engaging said stop to preclude withdrawal of said mounting plate from said slot.

2. A releasable coupling comprising:
a mounting plate;
tool holder means on the front face of said mounting plate adapted to releasably secure a tool to the front face of said mounting plate;
a holding fixture defining a vertically extending slot at its front face generally conforming in size and configuration to said mounting plate for slidably and snugly receiving said mounting plate therein with the rear face of the mounting plate juxtaposed to and sliding on the front face of the holding fixture;
means on said holding fixture for releasably securing the rear face of said fixture to a support member;
means on said holding fixture for locking said mounting plate in said slot, said locking means including an elongate locking lever pivotally mounted on said holding fixture, said locking lever having a locking element shiftable into blocking relationship with the sliding path of said mounting plate upon pivoting of said locking lever, the longitudinal axis of said lever extending transverse to the path of sliding movement of said mounting plate within said slot; and
a stop on said holding fixture adjacent the bottom of said slot including surface areas for engaging the bottom edge of said mounting plate as the latter arrives at the bottom of said slot and thereby support substantially all of the weight of said mounting plate and associated tool.

3. The coupling of claim 2, including means carried by said holding fixture for normally biasing said locking element into said blocking relationship.

4. The coupling of claim 3, wherein said biasing means includes a spring, said locking element includes a depression for receiving said spring therein, and means releasably secured to said holding fixture for retaining said spring in said depression.

5. The coupling of claim 2 wherein said front face of said holding fixture includes a through hole therein therough which said locking element normally extends into said blocking relationship to said mounting plate, said locking element being disposed adjacent the top of said slot and including surface areas extending across said slot and engageable with the top of said mounting plate when the latter is fully inserted in said slot.

6. The coupling of claim 5, wherein said holding fixture includes a groove in the rear face thereof within which said locking lever is disposed.

7. The coupling of claim 1 wherein said tool holder comprises a clamp on the front face of said mounting plate for releasably holding said tool on said mounting plate.

8. A quick release adapter for releasably mounting a tool or the like on a support comprising:
- a holding member adapted to be connected to one of said support or said tool and including a slot therein;
- a mounting plate adapted to be connected with the other of said support or said tool and adapted to be slidably inserted in one direction into one end of said slot, said mounting plate having a size and configuration generally conforming to the size and configuration of said slot so as to fit snugly in said slot and including first and second opposite ends, said holding member including a through-hole therein adjacent said first end of said mounting plate with the latter inserted in said slot;
- a locking device shiftably mounted on said holding member and including a locking element disposed within said through-hole and shiftable from a released position in which it clears said first end of the inserted mounting plate, whereby said mounting plate may be slidably withdrawn in the other direction from said slot, to a locked position in which it engages said one end of said inserted mounting plate, whereby to prevent said mounting plate from being slidably withdrawn from said slot; and
- stop means on said holding member extending across the other end of said slot and operative to blockingly engage said second end of said mounting plate as the letter is inserted in said one direction into said slot through said one end thereof, whereby to limit and define the inserted position of said mounting plate in said slot.

9. The adapter of claim 8, including means for biasing said locking element toward said locked position and a lever pivotally mounted on said holding member, said locking element being mounted on said lever.

10. The adapter of claim 9, wherein said locking element includes a depression for retaining said biasing means therein.

11. The adapter of claim 8, wherein said mounting member includes an essentially flat plate and said holding member includes a generally flat face and a plurality of L-shaped legs extending outwardly from said face for engaging and retaining said plate.

* * * * *